United States Patent
Xu et al.

(10) Patent No.: US 8,369,863 B2
(45) Date of Patent: Feb. 5, 2013

(54) METHOD FOR INTERFERENCE SUPPRESSION

(75) Inventors: Xiaodong Xu, Beijing (CN); Ping Zhang, Beijing (CN); Dan Hu, Beijing (CN); Hongjia Li, Beijing (CN); Yi Li, Beijing (CN); Xiaofeng Tao, Beijing (CN); Qimei Cui, Beijing (CN); Sai Wang, Beijing (CN); Qiang Wang, Beijing (CN)

(73) Assignee: Beijing University of Posts and Telecommunications, Beijing (CN)

( * ) Notice: Subject to any disclaimer, the term of this patent is extended or adjusted under 35 U.S.C. 154(b) by 0 days.

(21) Appl. No.: 13/464,339

(22) Filed: May 4, 2012

(65) Prior Publication Data

US 2012/0309406 A1 Dec. 6, 2012

(30) Foreign Application Priority Data

May 31, 2011 (CN) .......................... 2011 1 0145404

(51) Int. Cl.
*H04W 72/00* (2009.01)
(52) U.S. Cl. ..................... 455/452.1; 455/450; 455/451; 455/452.2; 370/329
(58) Field of Classification Search .............. 455/452.1, 455/450, 451, 452.2; 370/329
See application file for complete search history.

(56) References Cited

U.S. PATENT DOCUMENTS

| | | | |
|---|---|---|---|
| 5,884,145 A * | 3/1999 | Haartsen ..................... | 455/63.2 |
| 6,295,453 B1 * | 9/2001 | Desgagne et al. ........... | 455/448 |
| 7,706,784 B2 | 4/2010 | Weiner et al. | |
| 7,768,983 B2 | 8/2010 | Nylander et al. | |
| 2002/0107024 A1 * | 8/2002 | Dev Roy ...................... | 455/447 |
| 2002/0173323 A1 * | 11/2002 | Tateson ........................ | 455/509 |
| 2010/0202289 A1 * | 8/2010 | Madan et al. ................ | 370/230 |
| 2011/0294514 A1 * | 12/2011 | Kulkarni ...................... | 455/450 |
| 2012/0015664 A1 * | 1/2012 | Han ........................... | 455/452.1 |
| 2012/0021753 A1 * | 1/2012 | Damnjanovic et al. ....... | 455/450 |

* cited by examiner

*Primary Examiner* — Charles Shedrick
(74) *Attorney, Agent, or Firm* — Bacon & Thomas, PLLC

(57) ABSTRACT

An interference suppression method is provided. A method includes the following steps: determining, by a Femtocell, a set of Femtocells which generate interference with said Femtocell based on information measured by and feedbacked from subscribers which are served by said Femtocell, and delivering the cell IDs of all Femtocells in said set to a Femtocell gateway; establishing, by the Femtocell gateway, a relationship graph on interference among Femtocells according to information delivered from the Femtocells, and clustering the Femtocells based on said relationship graph; determining the range influenced by each Femtocell cluster; allocating resources to the Femtocells in each isolated cluster or in the range influenced by each cluster. It may ensure liable communications of Femtocell subscribers as possible, and/or may maximize spectrum efficiency and system capacity of the Femtocell layer as possible.

8 Claims, 4 Drawing Sheets

METHOD FOR INTERFERENCE SUPPRESSION

FIELD OF THE INVENTION

This invention relates to wireless communication network technology field, especially a method for interference suppression between the Femtocells in macro-cells and Femtocell mix network.

BACKGROUND

Appearances of numerous high data rate wireless communication standards indicate that wireless communication has entered into an epoch with a rapid increase in reliability and capacity. Cooper's law explains the increase of wireless communication capacity well: "Wireless capacity has doubled every 30 months over the last 104 years". For example, since American civil wireless communication system was spread and applied, wireless communication capacity has increased by nearly 1,000,000 times, wherein use of wider band has brought increase by 25 times, smaller time and frequency scheduling granularity has brought increase by 5 times, better modulation method has brought increase by 5 times, decreasing cell coverage area and transmission distance has brought increase by 1600 times. Huge benefits brought by decreasing cell coverage area are essentially brought by improving intensity of signals received and spatial frequency spectrum utilization rate, i.e. throughput on unit area. Therefore, appearance of a Femtocell which is a cell structure to provide in-building coverage with low cost and high data rate is of serious concern by researchers, operators and device manufacturers.

Macro-cells are regions of very large coverage area, coverage radius of which is about 1-30 km, and transmitting antennas of base stations usually are placed above surrounding buildings. Typically, there is no direct antenna between sending and receiving. While the Femtocells are wireless data access cells with low power and short distance, the coverage of which usually is 10-50 m, and takes wideband connections, such as fibers or xDSL (x Digital Subscriber Line, xDSL), as a return pass. Appearances of Femtocells earn widespread respect, and 3GPP LTE has incorporated it into R8 standard and named it Home Node B.

Surveys on use of mobile communications indicate that more than 50% voice communication and more than 70% data communication occurs in buildings. Meanwhile cities are growing fast, especially in China, where buildings in urban area are more intensive, and population density is also growing fast, and increasingly heavier loads has been caused, and the quality of coverage in building is also an urgent problem to be solved. Femtocells have achieved fast development in recent years, not only is the standardization very mature, but also various commercial networks and experimental networks are applied in many countries around the world. Therefore, in the near future, more and more families choose to install a Home Node B in home, some office buildings and shopping centers also choose to arrange a Home Node B to improve the coverage in buildings, whereby intensive Femtocell arrangement is possible to occur. In order to utilize precious frequency spectrum resources better, by multiplexing frequency on space to maximize system capacity, it's a better choice to overlapping deploy frequency resources of Femtocells and traditional macro-cells, but it's certain to bring interference between Femtocells. Under extreme condition, two Femtocells are placed on the two sides of a wall respectively and use the overlapped resources. Therefore, if there is no efficient interference suppression algorithms and resource allocation algorithms, communications of subscribers in a Femtocell edge cannot be ensured and it leads to insufferable dropping rate.

SUMMARY OF THE INVENTION

(I) Technical Problem to be Solved

The technical problem to be solved may include: providing a method for interference suppression to mitigate interference within a same layer between Femtocells in a two layer network overlapped by macro-cells and Femtocells effectively, to ensure liable communications of Femtocell subscribers as possible, and to maximize spectrum efficiency and system capacity of the Femtocell layer as possible.

(II) Technical Solution

One aspect of the invention provides an interference suppression method, comprising the following steps:

S1, determining, by a Femtocell, a set of Femtocells which generate interference with said Femtocell based on information measured by and feedbacked from subscribers which are served by said Femtocell, and delivering the cell IDs of all Femtocells in said set to a Femtocell gateway;

S2, establishing, by the Femtocell gateway, a relationship graph on interference among Femtocells according to information delivered from the Femtocells, and clustering the Femtocells based on said relationship graph;

S3, determining the range influenced by each Femtocell cluster;

S4, allocating resources to the Femtocells in each isolated cluster or in the range influenced by each cluster.

According another aspect of the invention, the subscriber served by any one of the Femtocells measures useful signal intensity of said Femtocell, and signal powers and cell IDs of other Femtocells.

According another aspect of the invention, the useful signal intensity of a Femtocell measured by a subscriber is obtained by measuring pilot signal or reference signal of said Femtocell, in which the cell IDs are obtained by measuring synchronization signal, reference signal or pilot signal, and the measurement information is delivered to said Femtocell via an uplink feedback channel.

According another aspect of the invention, wherein in Step S1, determining by a Femtocell a set of Femtocells which generate interference with said Femtocell comprises the following substeps:

S1.1, if $$I_{total} < \frac{p_s}{\gamma_{th}},$$

then proceeding to a Substep S1.3, or else to Substep S1.2, wherein $$I_{total} = \sum_{i=1}^{n} I_i$$

is the sum of Femtocell interferences measured by subscribers served by the Femtocell, p, represents the useful signal intensity, $I_i$ (i=1, 2, . . . , n) represents signal intensity of other Femtocells, n represents the number of Femtocells measured by the subscribers, and $\gamma_{th}$ is a set value;

S1.2, selecting the maximum value from $I_i$ (i=1, 2, ..., n), deleting it and thus obtaining a new $I_{total}$, then returning to Substep S1.1;

S1.3, forming the set of Femtocells which generate interference with said Femtocell that serves the subscribers through the Femtocells corresponding to the $I_i$ deleted;

S1.4, if more than one subscriber is served by said Femtocell, then repeating Substeps S1.1 to S1.3, and using the union set of the sets obtained from Substep S1.3 as the final set, or else using the set obtained in Substep S1.3 as the final set.

According another aspect of the invention, in Step S2, establishing by the Femtocell gateway the relationship graph that is represented as G=(V,E) for all Femtocells in each building, wherein V is a set of endpoints which represents Femtocell, E represents edge sets, and $e_{k,l} \in \{0, 1\}$ represents an element of E; and if Femtocell k is in the interference set of Femtocell 1, or Femtocell Z is in the interference set of Femtocell k, then $e_{k,l}=1$, which means an interference relationship exists between Femtocell k and Femtocell l; or else, $e_{k,l}=0$.

According another aspect of the invention, in Step S2, the steps of clustering the Femtocells comprises the following substeps:

S2.1, if all elements other than the diagonal ones in the set E are 1, then forming a cluster $R_m$ consisting of the remained endpoints in the relationship graph G, and proceeding to Substep S2.3, or else to Substep S2.2, wherein in is the number of the clusters and the initial value thereof is 1;

S2.2, moving the endpoint with the minimum degree number in the relationship graph G into a set B, and deleting this endpoint and the edges connected thereto from the relationship graph G so as to generate a new set E, and returning to Substep S2.1, wherein said degree number is the number of edges connected to the endpoint;

S2.3, if the set B is not a null set, then using the endpoints in the set B to establish a new relationship graph G, clearing the set B and returning to Substep S2.1, or else Substep S2 is finished.

According another aspect of the invention, said range influenced by a cluster includes all Femtocells in the cluster, and Femtocells which are not in the cluster but interfere with the Femtocells in the cluster.

According another aspect of the invention, Step S4 further comprises the following substeps:

S4.1, for any m=1, 2, ..., $N_C$, if $\sigma_m=\zeta_m$, then defining the cluster $R_m$ as an isolated cluster; if $\sigma_m > \zeta_m$, then storing the range $g_m$ influenced by the cluster $R_m$ into a set $S_G$, wherein $S_g=\{g_1, ..., g_{N_z}\}$, $N_z$ is the total number of ranges influenced by the cluster, and $\sigma_m=|g_m|$ and $\zeta_m=|R_m|$ represent the numbers of Femtocells in $g_m$ and $R_m$ respectively;

S4.2, for said isolated cluster $R_m$, dividing the system resources into portions equally by $\zeta_m$, allocating each portion to a Femtocell in the cluster $R_m$, wherein the Femtocells in the cluster $R_m$ use resources which are orthogonal to each other;

S4.3, sorting $g_m$ in the set $S_G$ in the descending order of $\sigma_m$, obtaining a set $S_G'$;

S4.4, dividing the system resources into portions equally by $\sigma_i'$, which represents the number of Femtocells in the first element of $S_G'$;

S4.5, allocating, from the first element in $S_G'$, one portion of system resources determined in Substep S4.4 to each Femtocell in $S_G'$, until all the Femtocells in the range influenced by the clusters of $S_G'$ are allocated with resources, wherein, if a Femtocell is already allocated with resources, then it is no longer allocated with resources, and the Femtocells in the range influenced by the same cluster use resources orthogonal to each other.

(III) Technical effects

The method for interference suppression in this invention realizes interference suppression between Femtocells by resources allocation so as to ensure liable communications of Femtocell subscribers, and meanwhile to maximize the spectrum efficiency and system capacity of the Femtocell layer in a two layer network which overlapping by macro-cells and Femtocells.

DESCRIPTION OF THE PREFERRED EMBODIMENT

The method for interference suppression provided in this invention is described in the embodiments as follows in detail with reference to the figures.

One of the basic ideas in this invention is as follows: a Femtocell determines a set of Femtocells which generate interference to it based on the measurement and feedback information from subscribers served by it, and sends the cell IDs of all the Femtocells in said set to a Femtocell gateway (F-GW); F-GW makes an relationship graph on interference among the Femtocells according to the information sent from Femtocells, and further clusters the Femtocells based on said relationship graph, wherein the clustering principle is that the Femtocells which have interference relationship are clustered into the same cluster as far as possible, and the Femtocells which don't have interference relationship mustn't be clustered into the same cluster; and determines the range influenced by each Femtocell cluster and further determines isolated clusters; and allocates resources to the Femtocells in isolated clusters and Femtocells in other clusters.

Figure 1:
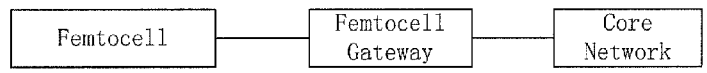
FIG. 1 is a Femtocell structure schematic diagram based by the method for interference suppression according to an embodiment in this invention.

This embodiment is based on the Femtocell structure as shown in FIG. 1. Femtocell is connected to a Femtocell gateway (F-GW) via a Digital Subscriber Line (DSL), and the F-GW connects the core network of operators. The F-GW is responsible for allocating resources to Femtocells in this embodiment.

Figure 2:
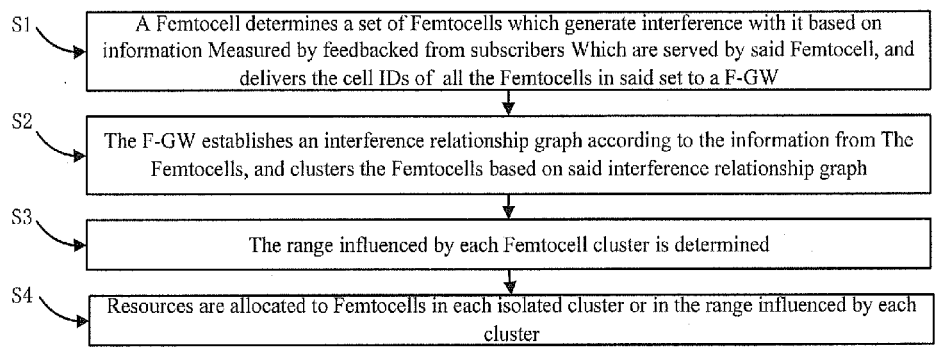
FIG. 2 is a flow chart of the method for interference suppression according to an embodiment in this invention.

As shown in FIG. 2, the method for interference suppression according to an embodiment in this invention may comprise the steps as follows:

S1, a Femtocell, based on the measurement and feedback information from subscribers served by it, determines a set of Femtocells which generate interference to it, and sends the cell IDs of all the Femtocells in said set to a Femtocell gateway. Femtocell subscribers can obtain signal intensity of each cell by measuring a pilot signal, a reference signal, or the like; Femtocell subscribers can obtain cell IDs by measuring a synchronization signal, the reference signal or the pilot signal and send the measurement information to the present Femtocell via an uplink feedback channel.

S2, the F-GW makes (establishes) a relationship graph on interference among Femtocells (also referred to as interference relationship graph) according to the information from Femtocells, and clusters the Femtocells based on said interference relationship graph;

S3, the range influenced by each Femtocell cluster is determined;

S4, resources are allocated to Femtocells in each isolated cluster or in the range influenced by each cluster.

Figure 3:
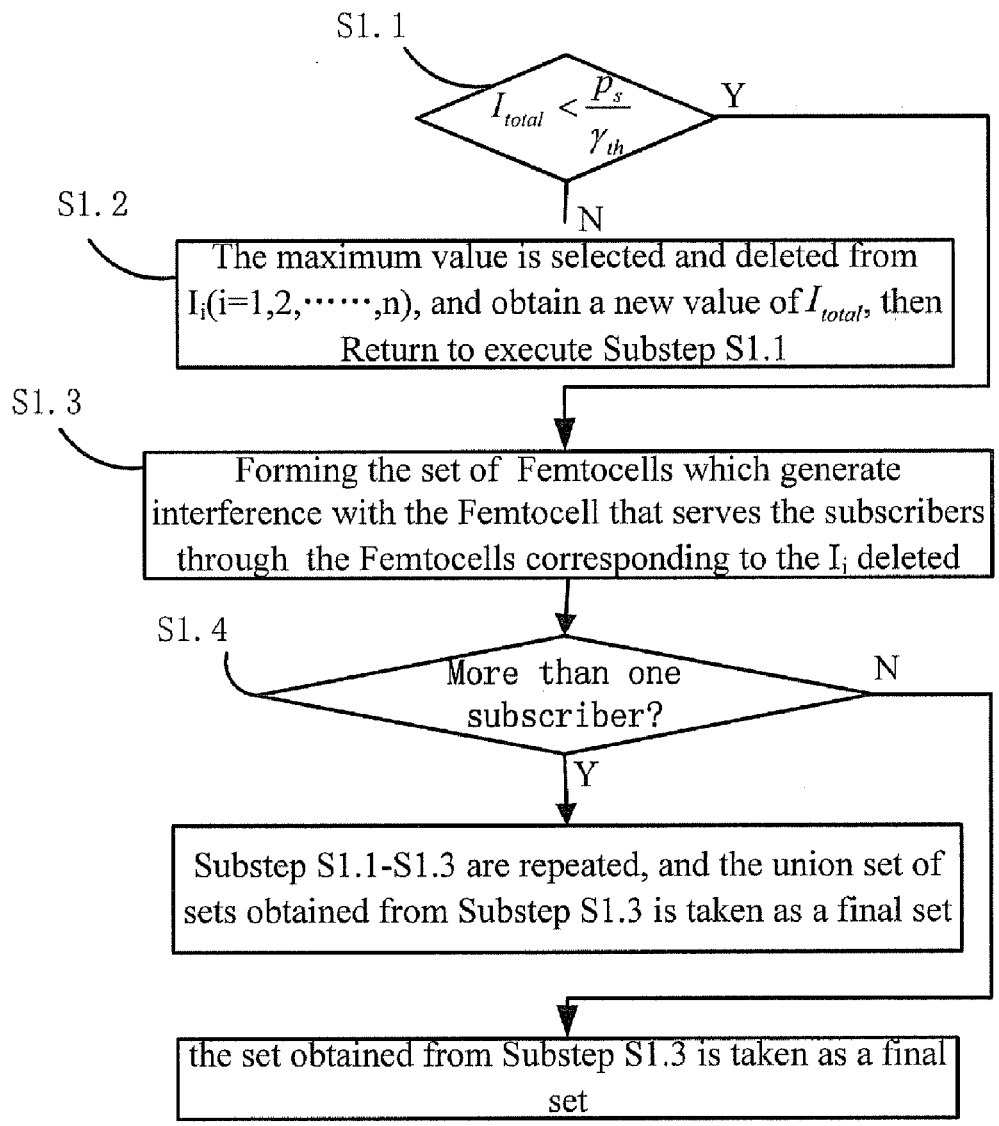
FIG. 3 is a flow chart for determining interference sets according to an embodiment in this invention.

As shown in FIG. 3, in Step S1, the substeps of the Femtocell determining the set of Femtocells which generate interference to it comprise:

$$S1.1, I_{total} = \sum_{i=1}^{n} I_i$$

is the sum of interferences from near Femtocell measured by a subscriber served by a Femtocell, if $$I_{total} < \frac{P_s}{\gamma_{th}},$$

then proceed to Step S1.3, or else to Step S1.2, wherein $P_s$ is the useful signal intensity, $I_i$ is the signal intensity of other Femtocells, in which i=1, 2, . . . , n, n is the number of Femtocells measured by the subscriber, and $\gamma_{th}$ is a set value;

S1.2, the maximum value is selected and deleted from $I_i$ (i=1, 2, . . . , n), and obtain a new value of $I_{total}$, and return to execute Step S1.1;

S1.3, the Femtocells corresponding to the $I_j$ deleted constitutes the set of Femtocells which generate interference to the Femtocell serving the subscriber;

S1.4, if the number of subscribers served by said Femtocell is more than one, then Step S1.1 to S1.3 are repeated, and the union set of the sets obtained from Step S1.3 is used as a final set, or else the set obtained in Step S1.3 is used as a final set.

Figure 4:
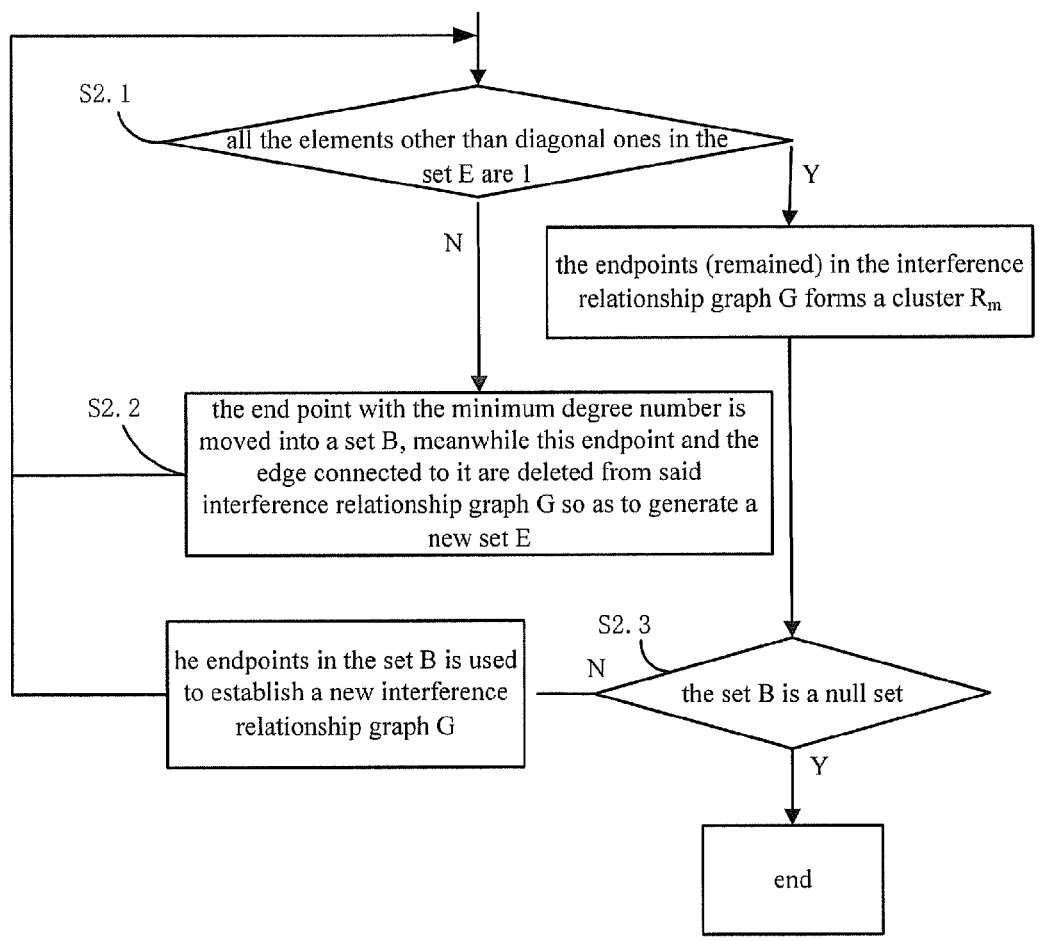
FIG. 4 is a flow chart for clustering the Femtocells according to an embodiment in this invention.

Because the interference between the Femtocells installed in different buildings is small and can be ignored, in order to reduce the complexity of the algorithm and calculation quantity of the F-GW, in step 2, On a building by building basis, the F-GW makes the interference relationship graph, which is represented as G=(V,E), for all the Femtocells in a building, wherein V is a set of endpoints which represents Femtocells, E is an edge set, and $e_{k,l} \in \{0,1\}$ represents an element of E; if Femtocell k is in the interference set of Femtocell l, or Femtocell l is in the interference set of Femtocell k, then $e_{k,l}=1$ which means there is interference relationship between Femtocell k and Femtocell l, or else $e_{k,l}=0$ As shown in FIG. 4, in Step S2, the steps of clustering the Femtocells comprise:

S2.1, if all the elements other than diagonal ones in the set E are 1, then the endpoints (remained) in the interference relationship graph G constitute a cluster $R_m$, and proceed to Step S2.3, or else proceed to Step S2.2, wherein m is the number of the cluster, and the initial value is 1;

S2.2, the endpoint with the minimum degree number is moved into a set B, and this endpoint and the edges connected to it are deleted from said interference relationship graph G so as to generate a new set E, and execute Step S2.1, wherein said degree number is the number of edges connected to an endpoint;

S2.3, if the set B is not a null set, then the endpoints in the set B is used to make a new interference relationship graph G, the set B is cleared and return to Step S2.1, or else S2 is finished.

The range influenced by a cluster includes all the Femtocells in this cluster and Femtocells which are not in this cluster but have interference relationship with the Femtocells in this cluster.

Figure 5:
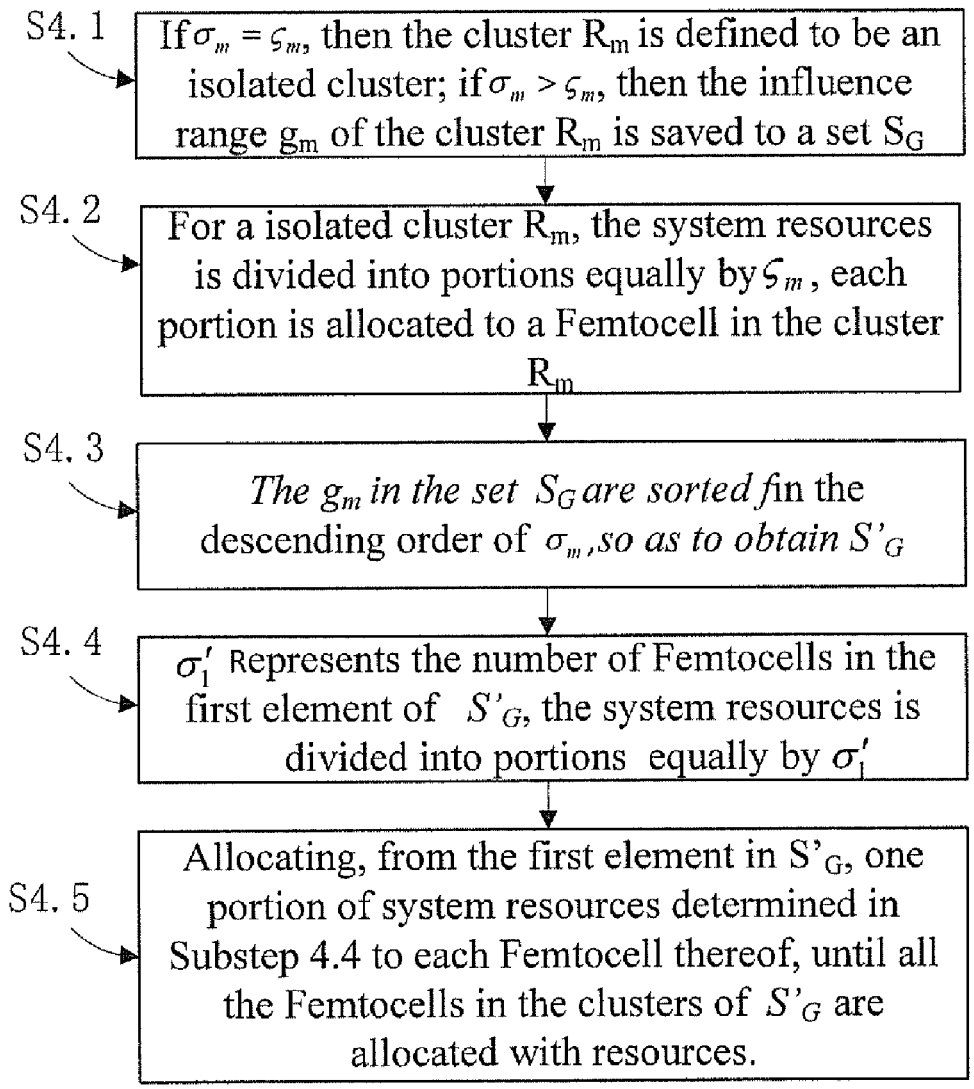
FIG. 5 is a flow chart for allocating resources to Femtocells in each cluster or Femtocells in the range influenced by each cluster according to an embodiment in this invention.

As shown in FIG. 5, Step S4 comprises substeps as follows:

S4.1, for any m=1, 2, . . . , $N_C$, if $\sigma_m = \zeta_m$, then the cluster $R_m$ is defined to be (taken as) an isolated cluster; if $\sigma_m > \zeta_m$, then the influence range $g_m$ of the cluster $R_m$ is saved to a set $S_G$, wherein $S_g = \{g_1, \ldots, g_{N_g}\}$, $N_g$ is the total number of influence range of a cluster, and $\sigma_m = |g_m|$ and $\zeta_m = |R_m|$, represent the number of Femtocells in $g_m$ and $R_m$ respectively;

S4.2, for said isolated cluster $R_m$, the system resources is divided into portions equally by $\zeta_m$, each equal portion is allocated to a Femtocell in the cluster $R_m$, and Femtocells in the cluster $R_m$ use resources which are orthogonal to each other;

S4.3, the $g_m$ in the set $S_G$ are sorted in the descending order of $\sigma_m$ obtaining $S_G'$;

S4.4, represents the number of Femtocells in the first element of $S_G'$, the system resources is divided into portions equally by $\sigma_l'$;

S4.5, one portion of system resources determined in Step S4.4 is allocated to each Femtocell $S_G'$, from the first element in $S_G'$, until all the Femtocells in the clusters of $S_G'$ have been allocated with resources, wherein if a Femtocell is already allocated with resources, then resources are no longer allocated to it; and the Femtocells in the same cluster are made to use resources orthogonal to each other.

The preferred embodiments above are only used to illustrate the invention, rather than to limit the present invention. A person of ordinary skills in the relevant technical fields without departing from the spirit and scope of the present invention can also make various modifications and changes, so all equivalent technical solutions belong to the scope of the present invention, and the scope of patent protection of this invention should be defined by claims.

The invention claimed is:

1. An interference suppression method, comprising the following steps:
   S1, determining, by a Femtocell, a set of Femtocells which generate interference with said Femtocell based on information measured by and feedbacked from subscribers which are served by said Femtocell, and delivering the cell IDs of all Femtocells in said set to a Femtocell gateway;
   S2, establishing, by the Femtocell gateway, a relationship graph on interference among Femtocells according to information delivered from the Femtocells, and clustering the Femtocells based on said relationship graph;
   S3, determining the range influenced by each Femtocell cluster;
   S4, allocating resources to the Femtocells in each isolated cluster or in the range influenced by each cluster.

2. The interference suppression method according to claim 1, wherein the subscriber served by any one of the Femtocells measures useful signal intensity of said Femtocell, and signal powers and cell IDs of other Femtocells.

3. The interference suppression method according to claim 2, wherein the useful signal intensity of a Femtocell measured by a subscriber is obtained by measuring pilot signal or reference signal of said Femtocell, in which the cell IDs are obtained by measuring synchronization signal, reference signal or pilot signal, and the measurement information is delivered to said Femtocell via an uplink feedback channel.

4. The interference suppression method according to claim 3, wherein in Step S1, determining by a Femtocell a set of Femtocells which generate interference with said Femtocell comprises the following substeps:

S1.1, if $$I_{total} < \frac{p_s}{\gamma_{th}},$$

then proceeding to Substep S1.3, or else to Substep S1.2, wherein $$I_{total} = \sum_{i=1}^{n} I_i$$

is the sum of Femtocell interferences measured by subscribers served by the Femtocell, $p_s$ represents the useful signal intensity, $I_i$ (i=1, 2, . . . , n) represents signal intensity of other Femtocells, n represents the number of Femtocells measured by the subscribers, and $\gamma_{th}$ is a set value;

S1.2, selecting the maximum value from $I_i$ (i=1, 2, n), deleting it and thus obtaining a new $I_{total}$, then returning to Substep S1.1;

S1.3, forming the set of Femtocells which generate interference with said Femtocell that serves the subscribers through the Femtocells corresponding to the $I_i$ deleted;

S1.4, if more than one subscriber is served by said Femtocell, then repeating Substeps S1.1 to S1.3, and using the union set of the sets obtained from Substep S1.3 as the final set, or else using the set obtained in Substep S1.3 as the final set.

5. The interference suppression method according to claim 1, wherein in Step S2, establishing by the Femtocell gateway the relationship graph that is represented as G=(V,E) for all Femtocells in each building, wherein V is a set of endpoints which represents Femtocell, E represents edge sets, and $e_{k,l} \in \{0,1\}$ represents an element of E; and if Femtocell k is in the interference set of Femtocell l, or Femtocell l is in the interference set of Femtocell k, then $e_{k,l}=1$, which means an interference relationship exists between Femtocell k and Femtocell l; or else, $e_{k,l}=0$.

6. The interference suppression method according to claim 5, wherein in Step S2, the steps of clustering the Femtocells comprises the following substeps:

S2.1, if all elements other than the diagonal ones in the set E are 1, then forming a cluster $R_m$ consisting of the remained endpoints in the relationship graph G, and proceeding to Substep S2.3, or else to Substep S2.2, wherein m is the number of the clusters and the initial value thereof is 1;

S2.2, moving the endpoint with the minimum degree number in the relationship graph G into a set B, and deleting this endpoint and the edges connected thereto from the relationship graph G so as to generate a new set E, and returning to Substep S2.1, wherein said degree number is the number of edges connected to the endpoint;

S2.3, if the set B is not a null set, then using the endpoints in the set B to establish a new relationship graph G, clearing the set B and returning to Substep S2.1, or else Substep S2 is finished.

7. The interference suppression method according to claim 1, wherein said range influenced by a cluster includes all Femtocells in the cluster, and Femtocells which are not in the cluster but interfere with the Femtocells in the cluster.

8. The interference suppression method according to claim 7, wherein Step S4 further comprises the following substeps:

S4.1, for any m=1, 2, . . . , $N_C$, if $\sigma_m = \zeta_m$, then defining the cluster $R_m$ as an isolated cluster; if $\sigma_m > \zeta_m$, then storing the range $g_m$ influenced by the cluster $R_m$ into a set $S_G$, wherein $S_g = \{g_1, \ldots, g_{N_g}\}$, $N_g$ is the total number of ranges influenced by the cluster, and $\sigma_m = |g_m|$ and $\zeta_m = |R_m|$ represent the numbers of Femtocells in $g_m$ and $R_m$ respectively;

S4.2, for said isolated cluster $R_m$, dividing the system resources into portions equally by $\zeta_m$, allocating each portion to a Femtocell in the cluster $R_m$, wherein the Femtocells in the cluster $R_m$ use resources which are orthogonal to each other;

S4.3, sorting $g_m$ in the set $S_G$ in the descending order of $\sigma_m$, obtaining a set $S_G'$;

S4.4, dividing the system resources into portions equally by $\sigma_l'$, which represents the number of Femtocells in the first element of $S_G'$;

S4.5, allocating, from the first element in $S_G'$, one portion of system resources determined in Substep S4.4 to each Femtocell in $S_G'$, until all the Femtocells in the range influenced by the clusters of $S_G'$ are allocated with, resources, wherein, if a Femtocell is already allocated with resources, then it is no longer allocated with resources, and the Femtocells in the range influenced by the same cluster use resources orthogonal to each other.

* * * * *